United States Patent [19]

Dickason

[11] 3,899,516

[45] Aug. 12, 1975

[54] OXIDATION OF BUTANE TO MALEIC ANHYDRIDE USING BUTANE-RICH FEED

[75] Inventor: Alan F. Dickason, Chester, Pa.

[73] Assignee: Sun Ventures, Inc., St. Davids, Pa.

[22] Filed: Oct. 17, 1973

[21] Appl. No.: 407,347

[52] U.S. Cl............ 260/346.8 A; 252/435; 252/467; 252/468; 252/470
[51] Int. Cl.². ...................................... C07D 307/60
[58] Field of Search ........ 260/346.8, 435, 467, 468, 260/470, 469

[56] References Cited
UNITED STATES PATENTS

| | | | |
|---|---|---|---|
| 2,415,531 | 2/1947 | Porter | 260/346.8 |
| 2,691,660 | 10/1954 | Hartig | 260/346.8 |
| 3,478,063 | 11/1969 | Fredrichsen et al. | 260/346.8 |
| 3,832,359 | 8/1974 | Freenk et al. | 260/346.8 |

FOREIGN PATENTS OR APPLICATIONS

| | | | |
|---|---|---|---|
| 2,072,336 | 9/1971 | France | 260/346.8 |

*Primary Examiner*—Harry I. Moatz
*Attorney, Agent, or Firm*—George L. Church; Donald R. Johnson; Stanford M. Back

[57] ABSTRACT

In the oxidation of n-butane to maleic anhydride using a variety of catalysts, a substantial improvement in the selectivity for maleic anhydride is obtained when the mole ratio of butane to oxygen is greater than 1:4.

12 Claims, No Drawings

OXIDATION OF BUTANE TO MALEIC ANHYDRIDE USING BUTANE-RICH FEED

CROSS-REFERENCE TO RELATED APPLICATIONS

The subject matter of the present case is closely related to that of the following copending applications:

| SERIAL NUMBER | TITLE | INVENTOR(S) |
|---|---|---|
| S.N.(Docket S-72-029) | Oxidation of Butane to Maleic Anhydride | Dickason et al |
| S.N.(Docket S-72-210) | Oxidation of Butane to Maleic Anhydride | Dickason et al |
| S.N.(Docket S-72-210L) | Oxidation of Butane to Maleic Anhydride | A.F.Dickason et al |

BACKGROUND OF THE INVENTION

This invention relates to an improved process for the production of maleic anhydride. More particularly, this invention relates to a process for the vapor phase catalytic oxidation of n-butane to maleic anhydride using high ratios of butane to oxygen in order to improve the selectivities for said maleic anhydride.

In the three copending applications listed in the above paragraph, there is described a general method for the vapor phase oxidation of n-butane to maleic anhydride wherein, in each instance, a novel catalyst system is employed. Also disclosed therein are other like catalytic oxidations known in the prior art. In each case, however, the general mode of operation taught is to run the vapor phase reactor with a hydrocarbon-lean gas mixture relative to the amount of oxygen employed, i.e., less than about 2% butane. This is customarily done for safety purposes, so that mole ratios of about 1:4 or lower, and preferably ratios of 1:10 down to about 1:20 of butane to oxygen are the general rule. Under these conditions, it has been found that the selectivity for maleic anhydride is generally between 25 and 50 percent.

Other relevant prior art generally pertaining to the subject matter of this invention is represented by Belgian Pat. No. 791,294, and German Patent publication No. 2,256,909.

SUMMARY OF THE INVENTION

It has now been found that, contrary to general practice and expectations, when the oxygen is employed as pure oxygen rather than diluted with inert gases, e.g., with nitrogen as in air, and the concentration of butane relative to the oxygen is increased to ratios of greater than 1:4, preferably greater than 1:1, in order to operate outside the explosive limits, the selectivity for maleic anhydride is increased about 20 percent over what is obtained with a hydrocarbon—lean feed but without any dangerous side effects. Thus, it has been found that ratios of greater than 1:4 may be employed, and preferably ratios in the range of about 1:1 to 20:1 of butane to oxygen. Furthermore, a significant increase in space-time-yield is obtained when the $C_4^{--} : O_2$ ratio is changed and substantially pure oxygen is employed in place of air. By "substantially pure oxygen" is meant oxygen which may contain up to about 5 percent of inert gaseous impurities.

This feature is of great economic significance when designing a commercial plant. There is an obvious advantage with the higher space-time-yield in that the reactor size can be substantially reduced, and operated at lower temperatures. That is to say, the gain achieved by the increased activity permits, if desired, operation at lower temperatures instead to obtain the same yields as compared with operating in the conventional hydrocarbon-lean mode.

DESCRIPTION OF THE INVENTION

The vapor phase oxidation of butane to maleic anhydride, in accordance with the process of this invention, may conveniently be carried out by passing the butane, together with oxygen over a bed of suitable catalyst at temperatures of from about 350° to 650°C, and preferably about 400° to 500°C, at contact times of from about 0.001 sec. to 10 sec., and preferably about 0.1 to 2 sec., and at pressures ranging from atmospheric pressure to about 100 lbs/in.$^2$, where the catalyst bed may be either a fixed bed, a fluidized bed, or a moving bed. The concentration of oxygen, relative to the amount of butane should, of course, be in accordance with the aforedescribed ratios.

The catalysts which may be used include any catalyst known to oxidize butane to maleic anhydride, and is not intended to be limited to the examples shown or otherwise referred to. Thus, included amongst the catalysts which are suitable for purposes of this invention are such prior art metals, metal oxide and/or metal salt combination as Co/Mo (U.S. Pat. Nos. 2,625,519 and 2,691,660); V/Mo/alkali metal chloride (U.S. Pat. No. 3,074,969); V/P (U.S. Pat. No. 3,293,268); V/Ti/Mo/Al (U.S. Pat. No. 3,055,842); as well as the four component vanadium catalysts as Fe/V/Sb/MoO, plus one other metal (German Pat. No. 2,138,692).

Also included amongst the catalysts which may be used in this process are those taught in the three cross-referenced cases of Dickason, and Dickason et al. listed above, which three cases are hereby expressly incorporated herein by reference. In the first of these cases, Ser. No. 407,340, filed Oct. 17, 1973, there is disclosed a butane to maleic anhydride oxidation catalyst comprising Sb/Mo and a third metal selected from the group consisting of Ni, Co, Cu and Zn, wherein said catalyst contains at least about 40 atomic percent antimony, less than about 20 percent molybdenum, and less than about 40 percent of said third metal.

In the second case, Ser. No. 407,342, filed Oct. 17, 1973, there is disclosed a catalyst comprising a V/P catalyst containing a third metal selected from the group consisting of Fe, Co, and Ni, alternatively with tungsten as a fourth component. This catalyst is preferably supported on TiO$_2$ as an inert carrier. The composition of this catalyst is desirably at least about 5 mole percent vanadium, less than about 80 mole percent phosphorus, and less than about 50 mole percent of the iron, cobalt or nickel.

Still another catalyst which may be used in the process of this invention is disclosed in Ser. No. 407,346, filed Oct. 17, 1973, in which the composition is the same as that of Ser No. 407,342, filed Oct. 17, 1973 except that Ca, Ba, or Mg is substituted for the Fe, Co, or Ni.

The invention will now be illustrated by the following examples.

EXAMPLE 1

Preparation of a antimony-nickel-molybdenum catalyst

Antimony pentachloride ($SbCl_5$, 149.5 g.) was added slowly to a stirred solution of nickel chloride hexahydrate ($NiCl_2 6H_2O$, 118.9 g.) in 500 milliliters of distilled water. (The temperature increased from 28°C to 42°C). The pH of the mixture was adjusted to 6.5 with concentrated aqueous ammonia using an ice bath to keep the temperature below 60°C. The mixture was then stirred for 45 minutes, filtered, the filter cake washed three times by resuspension in 500 milliliter portions of distilled water and filtered again. The moist filter cake was then mixed with ammonium molybdate [$(NH_4)_6Mo_7O_{24}\cdot 4H_2O$, 1.1 g.] in 100 milliliters of distilled water evaporated to a thick paste on a steam bath, and dried at 110°–120°C for 16 hours. The dried cake was broken to pass a 4 mesh screen and calcined from 25° to 700°C over 8 hours, then held at 700°–725°C for 16 hours.

EXAMPLE 2

A gaseous mixture of butane (65 mole %) and oxygen (35 mole %) was passed over 2 g of the antimony-nickel-molybdenum catalyst in a ⅜ inch × 2 ½ foot stainless steel reactor. The conditions and results obtained are summarized in the following table. For comparison a second run employing the butane: oxygen ratios of the prior art are also set forth.

TABLE I

| Catalyst | $C_1:O_2$ | Time (Sec) | Temp. (°C) | % Conv. | % Sel. | Space Time Yield |
|---|---|---|---|---|---|---|
| Sb/Ni/Mo | 1.6:1 | 0.20 | 428 | 2.4 | 51 | 103 |
| " | 1:20 | 0.98 | 400 | 68 | 25 | 30 |

From the foregoing comparison it will be seen that a significant increase in space-time-yield is obtained wherein said yield increased from 30 to 103 when the butane : oxygen ratio was changed from 1:20 to 1.6:1 and pure oxygen exployed in place of air. In terms of economic significance this means that a reactor size could be reduced by a factor of 3.

EXAMPLE 3

Preparation of an iron-vanadium-phosphorus catalyst supported on $TiO_2$

A warm solution of vanadyl oxalate (9.75gm) in formamide (16.25 gm) and distilled water (12.5 gm) is added to a mixture of ferric phosphate ($FePO_4 \cdot x H_2O$, 23.75 gm) and titanium dioxide ($TiO_2$, 11.25 gm), stirring with a plastic spatula until the powder is all wetted. Phosphoric acid (85% $H_3PO_4$, 29.0 gm) is then added and stirred until thoroughly mixed.

The mixture is then evaporated to a thick paste on a steam bath, and dried at 110°–120°C for 16 hours. The dried cake is broken to pass a 4-mesh screen, calcined from 50°–450°C over 4 hours and then held at 450°C for 4 hours.

EXAMPLE 4

A gaseous mixture of butane (62 mole %) and oxygen (38 mole %) is passed over 2.0 mls (1.3 gms) of a vanadium, iron, phosphorus catalyst supported on $TiO_2$ (as prepared in Example 3) contained in a ¼ × 6 inch stainless steel reactor. The contact time is 0.21 sec. at 478°C. The selectivity to maleic anhydride is 65 mole % at 2.2 percent conversion.

EXAMPLE 5

Preparation of a vanadium-calcium-phorphorus catalyst supported on $TiO_2$

A warm solution of vanadyl oxalate (9.75 gm) in formamide (16.25 gm) and distilled water (12.5 gm) is added to a mixture of ferric phosphate ($Ca_3(PO_4)_2 : x H_2O$, 23.75 gm) and titanium dioxide ($TiO_2$, 11.25 gm), stirring with a plastic spatula until the powder is all wetted. Phosphoric acid (85% $H_3PO_4$, 29.0 gm) is then added and stirred until thoroughly mixed.

The mixture is then evaporated to a thick paste on a steam bath, and dried at 110°–120°C. for 16 hours. The dried cake is broken to pass a 4-mesh screen, calcined from 25°–450°C. over 4 hours and then held at 450°C. for 4 hours.

EXAMPLE 6

A gaseous mixture of butane (65 mole %) and oxygen (35 mole %) is passed over 2.0 mls. (1.3 gms) of a vanadium, calcium, phosphorus catalyst supported on $TiO_2$ (as prepared in Example 5) contained in a ¼ × 6 inch stainless steel reactor. The contact time is 0.19 sec. at 500°C. The selectivity to maleic anhydride is 56 mole % at 0.51 % conversion.

EXAMPLE 7

In accordance with the procedures of Example 2, a series of runs were carried out under various conditions, using different catalysts and butane : oxygen ratios (including some of the prior art for comparative purposes). The results are shown in the following table.

TABLE II

| RUN | CATALYST | $C_1:O_2$ | t(sec.) | TEMP(°C) | % CONV. | % SELECT. | STY |
|---|---|---|---|---|---|---|---|
| 1 | Co/Mo | 1:20 | .10 | 478 | 55 | 20 | 34 |
| 2 | Co/Mo | 1.6:1 | .22 | 468 | 1.4 | 44 | 46 |
| 3 | V/Fe/P/W/Ti | 1:20 | .20 | 550 | 36 | 42 | 20 |
| 4 | V/Fe/P/W/Ti | 3:1 | .21 | 475 | 1.14 | 68 | 69 |
| 5 | V/Fe/P/Ti | 1:20 | .23 | 550 | 32 | 45 | 20 |
| 6 | V/Fe/P/Ti | 1.6:1 | .19 | 478 | 1.95 | 66 | 119 |

The invention claimed is:

1. In a process for the catalytic vapor phase oxidation of butane to form maleic anhydride, the improvement wherein the oxidant is substantially pure oxygen, the ratio of butane to oxygen is greater than about 1:4, and the catalyst is a vanadium-phosphorus catalyst containing a third metal component selected from the group consisting of calcium, barium, and magnesium.

2. The process of claim 1 wherein the catalyst is supported on $TiO_2$.

3. The process of claim 1 wherein the mole ratio of butane to oxygen is from about 1:1 to 20:1.

4. In a process for the catalytic vapor phase oxidation of butane to maleic anhydride, the improvement wherein the oxidant is substantially pure oxygen, the ratio of butane to oxygen is greater than about 1:4, and the catalyst is an antimony-molybdenum catalyst containing a third metal component selected from the group consisting of nickel, cobalt, copper, and zinc.

5. The process of claim 4 wherein the mole ratio of butane to oxygen is from about 1:1 to 20:1.

6. In the process for the catalytic vapor phase oxidation of butane to maleic anhydride, the improvement wherein the oxidant is substantially pure oxygen, the ratio of butane to oxygen is greater than about 1:4, and the catalyst is a vanadium-phosphorus catalyst containing a third metal component selected from the group consisting of iron, cobalt, and nickel.

7. The process of claim 6 wherein the catalyst contains a fourth metal component comprising tungsten.

8. The process of claim 6 wherein the catalyst is supported on $TiO_2$.

9. The process of claim 7 wherein the catalyst is supported on $TiO_2$.

10. The process of claim 6 wherein the mole ratio of butane to oxygen is from about 1:1 to 20:1.

11. In the process for the catalytic vapor phase oxidation of butane to maleic anhydride, the improvement wherein the oxidant is substantially pure oxygen, the ratio of butane to oxygen is greater than about 1:4, and the catalyst is a cobalt-molybdenum catalyst.

12. The process of claim 9 wherein the mole ratio of butane to oxygen is from about 1:1 to 20:1.

* * * * *